(12) United States Patent
Ledger et al.

(10) Patent No.: US 10,392,146 B2
(45) Date of Patent: Aug. 27, 2019

(54) FOOD STORAGE APPLIANCE WITH BASED SEAL PROFILE

(71) Applicant: Sunbeam Products, Inc., Boca Raton, FL (US)

(72) Inventors: Scott Ledger, Wellington, FL (US); Eddy Fung, Kowloon (HK)

(73) Assignee: Sunbeam Products, Inc., Boca Raton, FL (US)

( * ) Notice: Subject to any disclaimer, the term of this patent is extended or adjusted under 35 U.S.C. 154(b) by 491 days.

(21) Appl. No.: 14/883,330

(22) Filed: Oct. 14, 2015

(65) Prior Publication Data

US 2016/0101885 A1 Apr. 14, 2016

Related U.S. Application Data

(60) Provisional application No. 62/063,834, filed on Oct. 14, 2014.

(51) Int. Cl.
| | | |
|---|---|---|
| *B65B 31/00* | (2006.01) | |
| *B65B 51/10* | (2006.01) | |
| *B29C 65/00* | (2006.01) | |
| *B65B 31/04* | (2006.01) | |
| *B65B 51/14* | (2006.01) | |
| *B29C 65/02* | (2006.01) | |
| *B65B 25/00* | (2006.01) | |

(52) U.S. Cl.
CPC .............. *B65B 51/10* (2013.01); *B29C 65/02* (2013.01); *B29C 66/00145* (2013.01); *B29C 66/81457* (2013.01); *B29C 66/8221* (2013.01); *B29C 66/8324* (2013.01); *B29C 66/849* (2013.01); *B65B 31/00* (2013.01); *B65B 31/048* (2013.01); *B65B 51/146* (2013.01); *B29C 66/1122* (2013.01); *B29C 66/43121* (2013.01); *B65B 25/001* (2013.01)

(58) Field of Classification Search
CPC ....... B65B 31/02; B65B 31/06; B65B 31/024; B65B 31/046; B65B 31/047; B65B 51/10; B65B 51/146; B65B 25/001; B29C 65/74; B29C 65/18; B29C 65/38; B29C 65/224; B29C 66/00145; B29C 66/81457; B29C 66/8324; B29C 66/849; B29C 66/1122
USPC .................. 53/510, 512, 86, 442, 551, 373.4
See application file for complete search history.

(56) References Cited

U.S. PATENT DOCUMENTS

| | | | | |
|---|---|---|---|---|
| 3,471,990 A | * | 10/1969 | Bonuchi | ............... B29C 65/749 426/410 |
| 3,699,742 A | * | 10/1972 | Giraudi | ................. B65B 31/024 53/374.8 |
| 3,752,725 A | | 8/1973 | Freeman | |

(Continued)

*Primary Examiner* — Alexander M Valvis
*Assistant Examiner* — Mary C Hibbert-Copeland
(74) *Attorney, Agent, or Firm* — Husch Blackwell LLP

(57) ABSTRACT

A food storage appliance is provided including a housing, a lid pivotally attached to the housing movable between an open and closed position, an elongated heat sealing element, an elongated resilient bumper mounted on an underside of the lid with a plurality of elastic members which bias the bumper into an extended position when the lid is open, and when the lid is moved to the closed position the bumper sandwiches a portion of a food storage container to be sealed against the heat sealing element while the elastic members allow the bumper to adjust to maintain even pressure on the food storage container along the elongated heat sealing element.

11 Claims, 4 Drawing Sheets

(56) References Cited

U.S. PATENT DOCUMENTS

| | | | | |
|---|---|---|---|---|
| 4,016,805 | A | * | 4/1977 | Hollis ................... B26D 5/22 |
| | | | | 226/155 |
| 4,768,326 | A | | 9/1988 | Kovacs |
| 4,856,260 | A | | 8/1989 | Woo et al. |
| 5,015,223 | A | | 5/1991 | Boeckmann |
| 5,415,724 | A | | 5/1995 | Perrett |
| 6,877,296 | B2 | | 4/2005 | Kohl et al. |
| 7,000,367 | B2 | * | 2/2006 | Sung ................... B65B 31/046 |
| | | | | 53/510 |
| 2003/0159405 | A1 | * | 8/2003 | Knowlton ............ B29C 65/743 |
| | | | | 53/434 |
| 2005/0022473 | A1 | * | 2/2005 | Small .................. B65B 31/046 |
| | | | | 53/434 |
| 2014/0196405 | A1 | * | 7/2014 | Owens ................. B65B 51/146 |
| | | | | 53/396 |

* cited by examiner

FOOD STORAGE APPLIANCE WITH BASED SEAL PROFILE

CROSS-REFERENCE TO RELATED APPLICATION

The present application claims the benefit of U.S. Provisional Patent Application No. 62/063,834 filed Oct. 14, 2014, entitled "Vacuum Sealer".

FIELD OF TEM INVENTION

The invention relates to food preservation, and more particularly to an improved food storage appliance having a spring biased sealing bumper for ensuring seal quality along the length of the heat seal.

BACKGROUND OF THE INVENTION

Vacuum packaging appliances that evacuate air from containers holding food are becoming increasingly popular with households for food preservation and storage. The removal of the air delays spoilage and extends the life of the food. The appliances are typically used in conjunction with bag material that constitutes the container holding the food. After the food is inserted in the storage container, the storage container is fitly sealed by applying heat and pressure to the remaining cut edges. A vacuum may be applied to evacuate air from the storage container before it is fully sealed. Still, not all vacuum packaging appliances can repetitively seal multiple storage containers while maintaining consistent seal quality.

SUMMARY OF THE INVENTION

In an embodiment, there is provided a food storage appliance including a housing, a lid pivotally attached to the housing movable between an open and closed position, an elongated heat sealing element, an elongated resilient bumper mounted on an underside of the lid with a plurality of elastic members which bias the bumper into an extended position when the lid is open, and when the lid is moved to the closed position the bumper sandwiches a portion of a food storage container to be sealed against the heat sealing element while the elastic members allow the bumper to adjust to maintain even pressure on the food storage container along the elongated heat sealing element.

In an embodiment, there is provided a food storage appliance including a housing, a lid pivotally attached to the housing movable between an open and closed position, a vacuum trough disposed in the housing, one or more electronic components including a vacuum motor fluidly connected to the vacuum trough and an elongated heat sealing element disposed in proximity of the vacuum trough, a resilient bumper mounted on an underside of the lid with a plurality of elastic members which bias the bumper into an extended position when the lid is open, and when the lid is moved to the closed position the bumper sandwiches a portion of a food storage container to be sealed against the heat sealing element while the elastic members allow the bumper to adjust to maintain even pressure on the food storage container along the heat sealing element.

In an embodiment, there is provided a food storage appliance including a housing, a lid pivotally attached to the housing movable between an open and closed position, a heat sealing element, and at least one stop extending downwardly from the underside of the lid which engages the housing in proximity to the heat sealing element when the lid is moved to the closed position to prevent further movement of the lid during evacuation or heat sealing of a food storage container.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
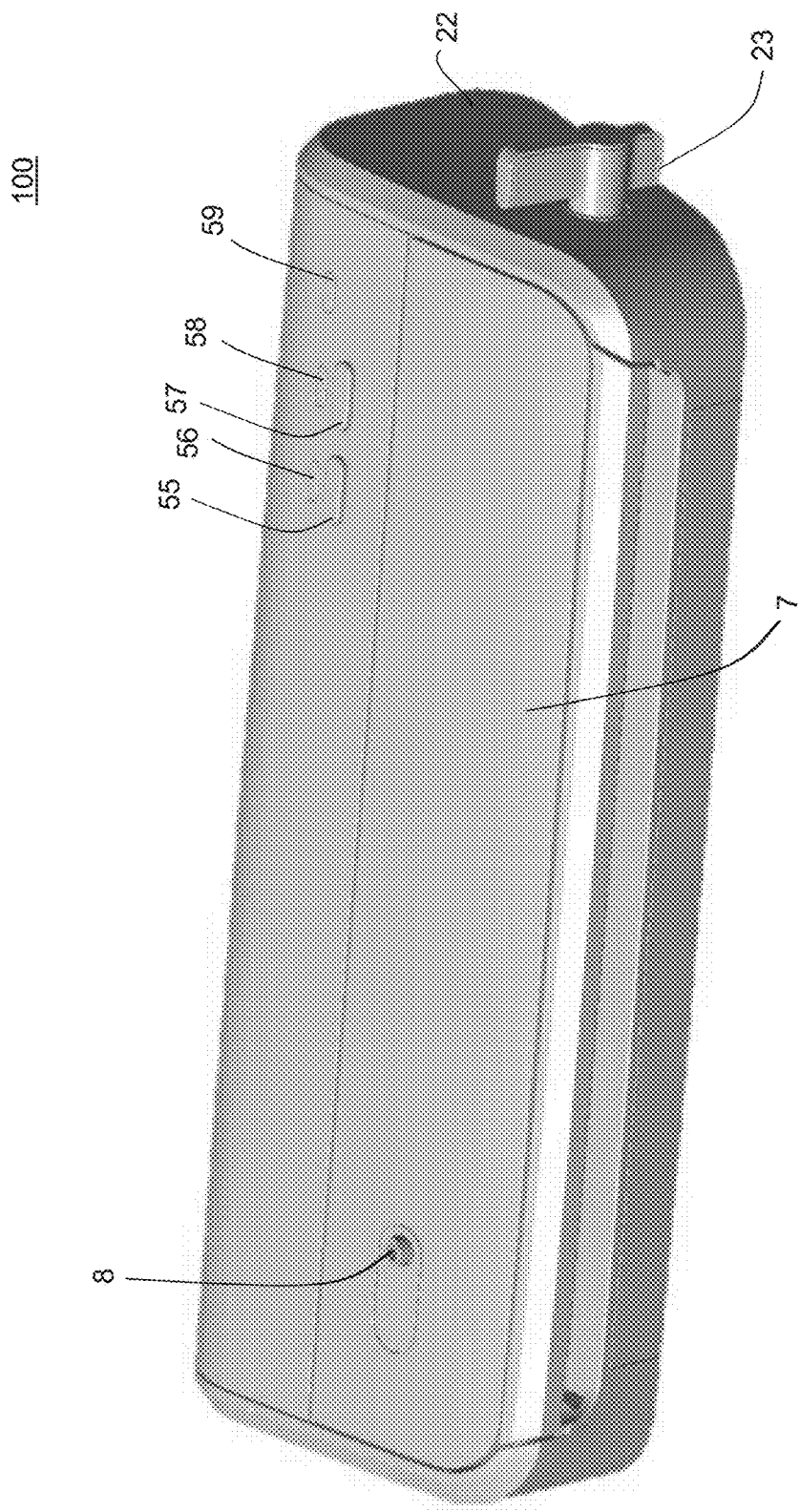
FIG. 1 is a perspective view of an embodiment of a food storage appliance.
Figure 2:
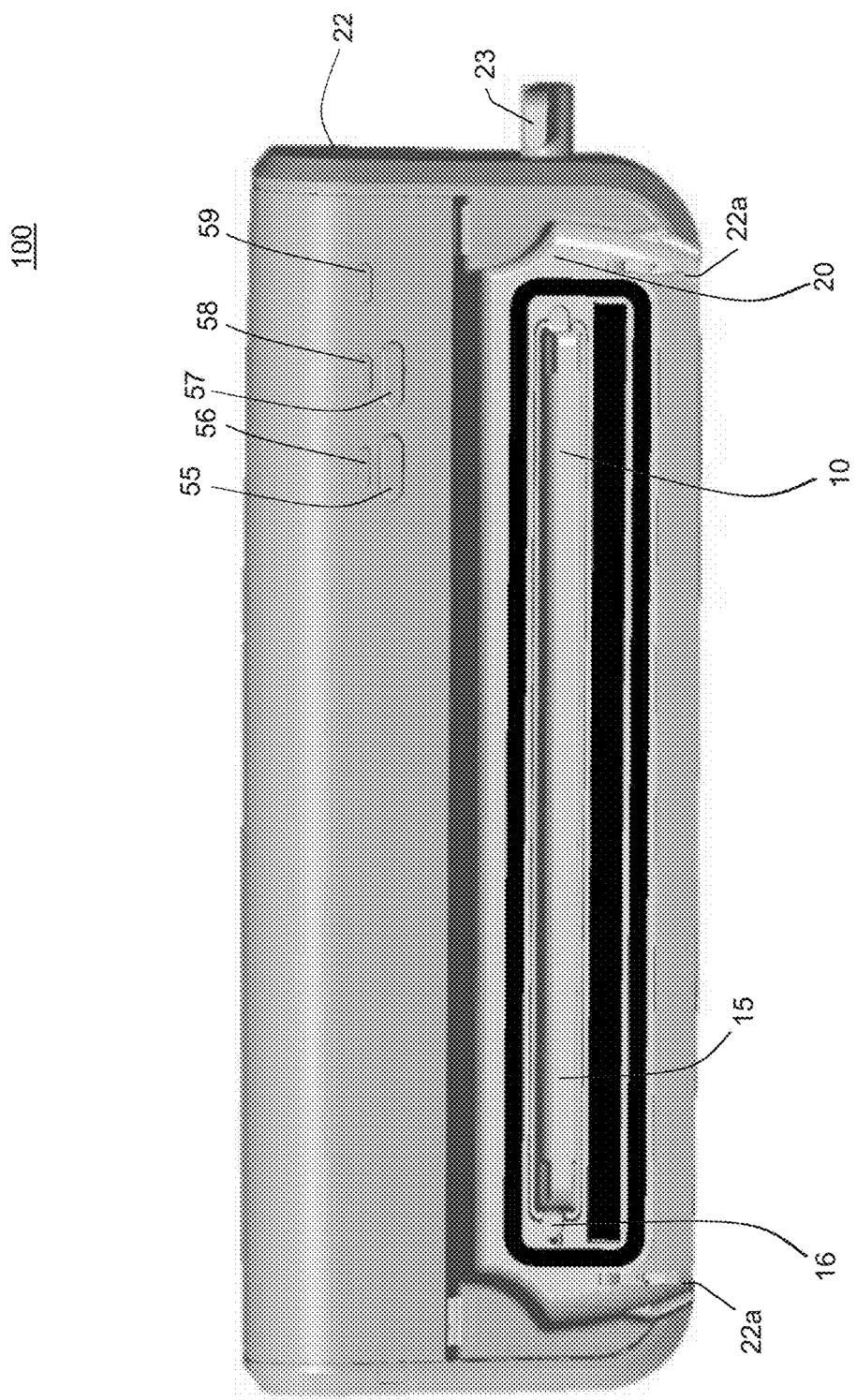
FIG. 2 is top view of the food storage appliance of FIG. 1 with the lid removed.
Figure 4:
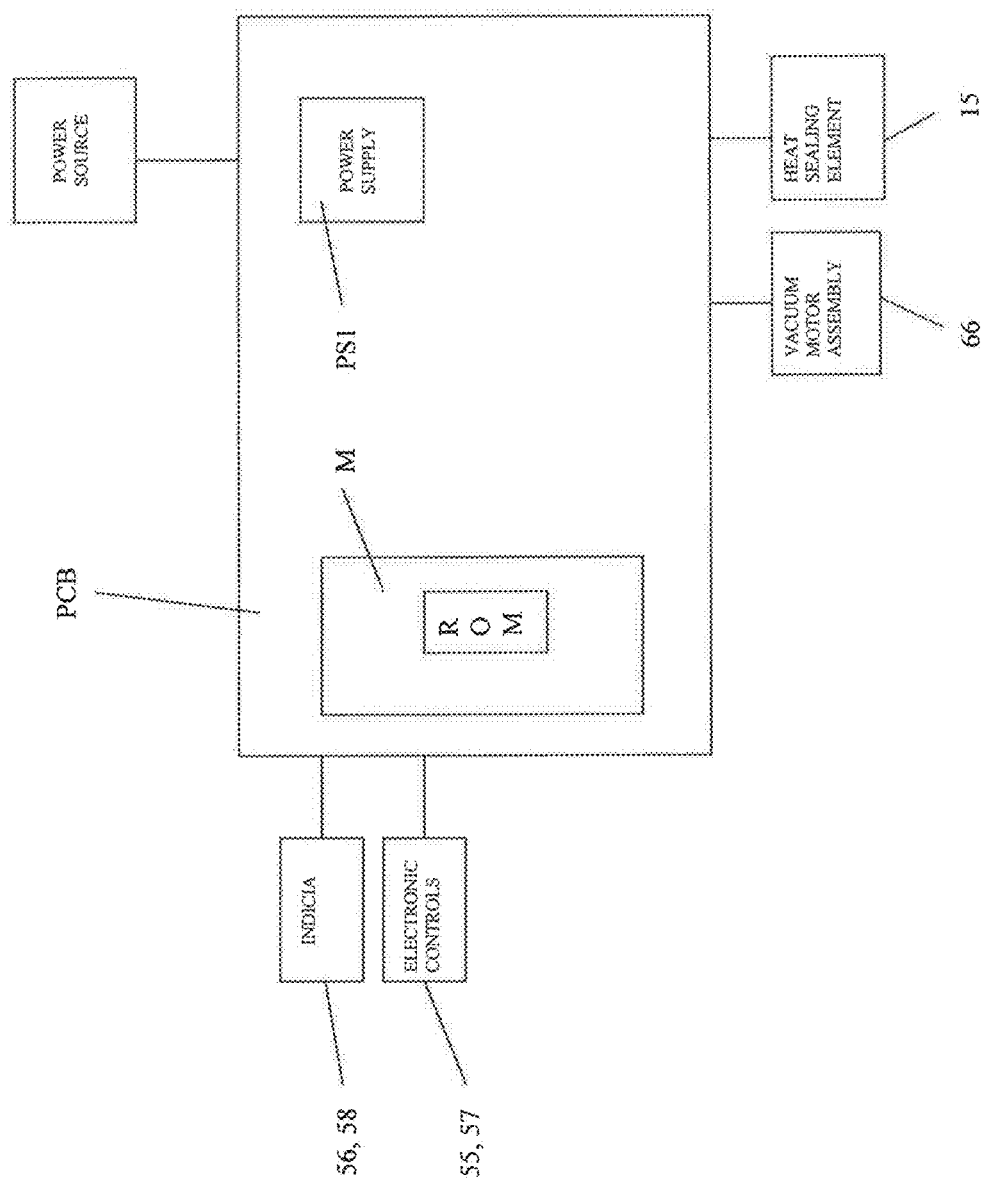
FIG. 4 is a block diagram of the major electronic components of the food storage appliance of FIG. 1.

Referring now to FIGS. 1-2 of the drawings, there is illustrated an embodiment of a food storage appliance 100 which includes a housing 22, a lid 7 pivotally attached to the housing 22, an accessory vacuum port 8, and a locking lever 23 for securing the lid 7 to the housing 22 in a closed configuration. The food storage appliance 100 is for evacuating and/or heat sealing a food storage container (not shown). The housing 22 includes a vacuum compartment 20 which is enclosed when the lid 7 is in the closed configuration. The vacuum compartment 20 includes an elongated vacuum trough 10 and an elongated heat sealing element 15. The heat sealing element 15 may be disposed in the vacuum compartment 20 in front of the vacuum trough 10. The housing 22 includes a vacuum motor assembly 66 (FIG. 4) and electronic controls such as switches 55 and 57 for controlling the heat sealing element 15 and/or and the vacuum motor assembly 66 (FIG. 4). The housing 22 also includes indicia 56, 58 and 59 which are lighted to provide a status of the electronic controls as described hereinbelow. A removable drip tray 16 may be fitted into the vacuum trough 10 for collecting fluids removed from the food preservation container (not shown) during an evacuation and/or sealing operation.

In use, an unsealed end of a flexible food storage container (not shown) such as a bag made from layers of a flexible film is inserted into the vacuum trough 10. The lid 7 is moved from an open position to a closed position and locked therein by rotating locking lever 23. The food storage container (not shown) is sandwiched between a resilient bumper 30 (FIG. 3) in the lid 7 and the heat sealing element 15. The heat sealing element 15 may be energized by depressing the switch 55 which also will illuminate indicia 56 until the heat sealing operation is complete after a pre-determined time (typically three (3) to twenty-one (21) seconds). Alternately, the switch 57 may be depressed to energize the vacuum motor assembly 66 (FIG. 4) for a pre-determined time or until a pre-determined vacuum is reached in the vacuum trough 10 to evacuate air and liquids from the food storage container (not shown). A pressure sensor (not shown) connected to the vacuum trough 10 may be provided for this purposes. After the pre-determined time has elapsed or the pre-determined vacuum has been reached and the vacuum motor assembly 66 (FIG. 4) has been de-energized, the heat sealing element 15 may be energized for a pre-determined time to heat seal the open end of the food storage container (not shown). Upon depressing the switch 57, the indicia 58 may be lighted to indicate that the evacuation and heat sealing operations have commenced. Upon completion of the heat sealing and/or evacuation operations, the indicia 56, 58 may be extinguished so that the food storage container (not shown) may be removed from the vacuum trough 10. The locking lever 23 is rotated to release the lid 7 and the food storage container (not shown) is removed from the vacuum compartment 20.

In an alternate embodiment, one of the switches 55, 57 may be used to energize the vacuum motor assembly 66 (FIG. 4) only to provide suction to the accessory port 8. A suction tube (not shown) may be attached to the suction port 8 to provide suction for evacuating a non-flexible food storage container (not shown) or to a marinade attachment (not shown).

More particularly, the electronic controls includes a user interface for controlling various functions of the food storage appliance 100. The electronic controls may include exteriorly exposed buttons (switches) 55, 57 for access by the user. For example, the button 55 may operate the heat sealing element 15 only. Alternately, the button 57 may operate both the vacuum motor assembly 66 (FIG. 4) and the heat sealing element 15. The indicia 59 may be lighted to indicate electrical power is being provided to the electronic controls and the electronic components within housing 22 as described below.

Referring now to FIG. 4, within the housing 22, the electronic components may include a microprocessor M mounted on a printed circuit board PCB with an operating control program stored in ROM that controls the vacuum motor assembly 66 and the heat sealing element 15, as discussed herein. The electronic components may also include other conventional components such as a power circuit PS1, an input interface circuit (not shown), an output interface circuit (not shown), and one or more storage devices ME, such as a ROM (Read Only Memory) device and a RAM (Random Access Memory) device. The power circuit PS1 is connected to an AC or DC power source and directs power to the motors, switches, sensors, etc. described herein, as well as provide power to other circuits and components of the electronic controls. The input interface circuit can be electrically connected to the buttons 55, 57 for user control. The output interface circuit can be electrically connected to indicia 56, 58 and 59 or a LCD screen. The storage device ME stores processing results and control programs that are run by the microprocessor circuit M. The electronic controls are capable of selectively controlling any of the vacuum motor assembly 66 and the heat sealing element 15 in accordance with the control program. It will be apparent to those skilled in the art from this disclosure that the precise structure and algorithms for the control panel can be any combination of hardware and software that will carry out the functions of the present invention.

Figure 3:
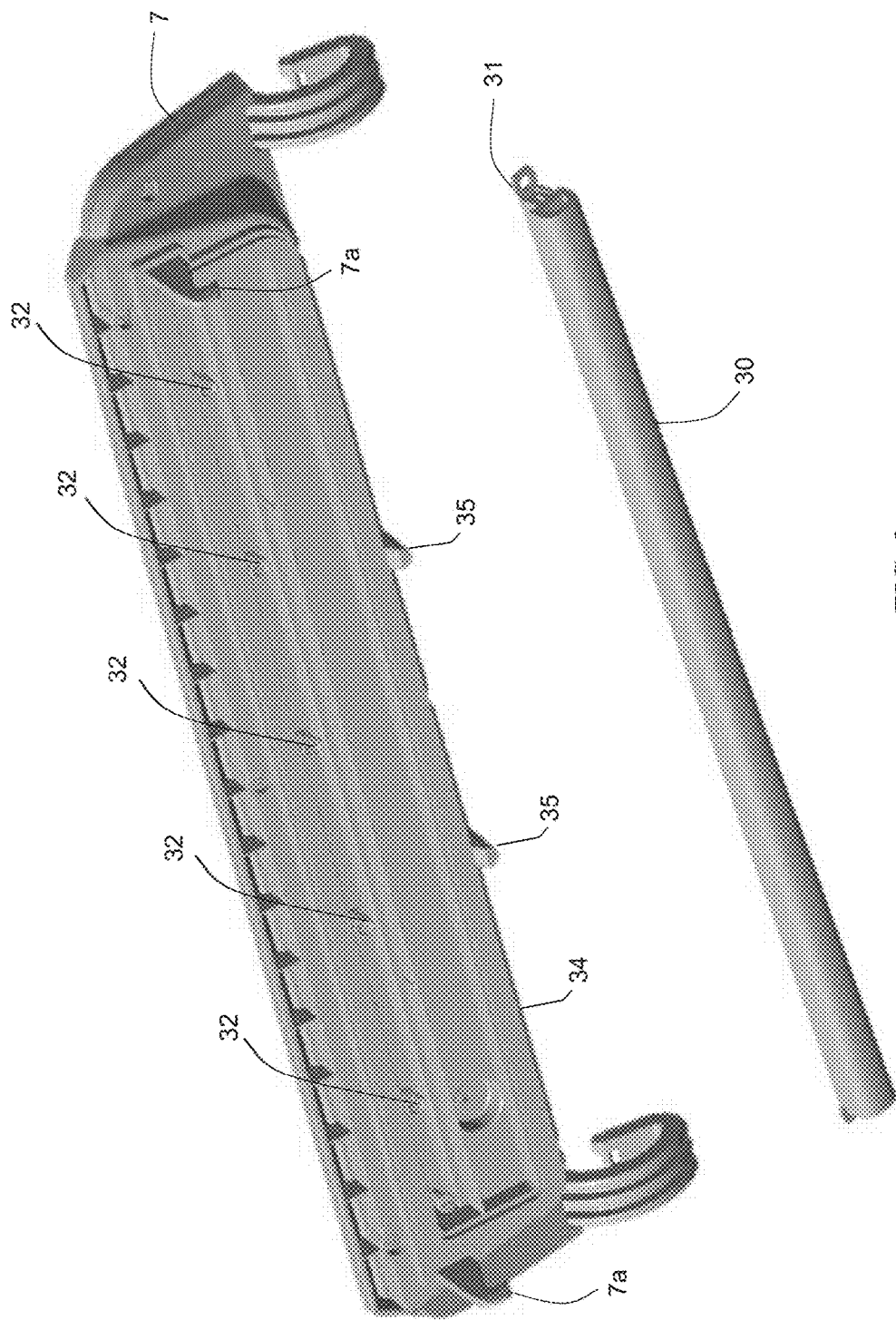
FIG. 3 is a partially exploded view of the lid of the food storage appliance of FIG. 1.

Referring now to FIG. 3, in an embodiment the lid 7 includes an elongated resilient bumper 30 mounted on a rail 31. The bumper 30 is comprised of an elastomer such as rubber or nylon. The rail 31 and bumper 30 are mounted on an underside of the lid 7 with fasteners such as screws (not shown) in front of a rectangular seal 34 which encloses the vacuum chamber 20 when the lid 7 is closed. The bumper 30 is mounted on an underside of the lid 7 in a floating manner such that a plurality of elastic members 32 are sandwiched between the rail 31 and the underside of the lid 7. In an embodiment, the elastic members 32 are springs. The elastic members 32 bias the bumper 30 into an extended position when the lid 7 is open, and when the lid 7 is moved to the closed position the bumper 30 sandwiches a portion of the food storage container (not shown) to be sealed against the heat sealing element 15. The elastic members 32 allow the bumper 30 to float minimizing and evenly loading pressure across the end of the food storage container (not shown) being sealed. In addition, there are a pair of stand offs 35 extending from the underside of the lid 7 behind the seal 34 which engage the housing 22 when the lid is in the closed configuration. The stand-offs 35 prevent the lid 7 from moving further downward after closing while preventing the bumper 30 from compressing too far which together with residual heat from the heat sealing element could pre-seal a food storage container (not shown) before the evacuation process has been completed. This improves repetitive sealing of food storage containers which otherwise could not be performed without sufficient time for cooling between repetitive sealing cycles.

The lid 7 further includes a pair of hooks 7a which are inserted into complementary slots 22a (FIG. 2) in the housing 22 when the lid 7 is closed. The pair of hooks 7a are secured in the slots 22a when the locking lever 23 is rotated to secure the lid 7 in the closed position.

The foregoing examples are not meant to be limiting as other possible modifications to the evacuating and sealing operations are possible.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A food storage appliance, comprising:
    a housing;
    a lid pivotally attached to the housing movable between an open and closed position;
    an elongated heat sealing element;
    an elongated resilient bumper mounted on an underside of the lid with a plurality of elastic members which always bias the bumper toward a completely extended position when the lid is open, and when the lid is moved to the closed position the bumper sandwiches a portion of a food storage container to be sealed against the heat sealing element while the elastic members always force the bumper against the food storage container and heat sealing element while allowing the bumper to adjust to maintain even pressure on the food storage container along the elongated heat sealing element; and
    at least one stand-off extending downwardly from a rear portion of the underside of the lid which engages the housing in proximity to the heat sealing element when the lid is moved to the closed position to prevent further downward movement of the lid during evacuation or heat sealing of the food storage container to prevent pre-sealing of a food storage container.

2. The appliance of claim 1, wherein the elastic members are springs.

3. The appliance of claim 1, wherein the resilient bumper is comprised of an elastomer.

4. The appliance of claim 3, wherein the elastomer is rubber.

5. A food storage appliance, comprising:
a housing;
a lid pivotally attached to the housing movable between an open and closed position;
a vacuum trough disposed in the housing;
one or more electronic components including a vacuum motor fluidly connected to the vacuum trough and an elongated heat sealing element disposed in proximity of the vacuum trough;
a resilient bumper mounted on an underside of the lid with a plurality of elastic members which bias the bumper into an extended position when the lid is open, and when the lid is moved to the closed position the plurality of elastic members always bias the bumper to sandwich a portion of a food storage container to be sealed against the heat sealing element while the elastic members allow the bumper to adjust to maintain even pressure on the food storage container along the heat sealing element; and
at least one stand-off extending downwardly from a rear portion of the underside of the lid which engages the housing in proximity to the heat sealing element when the lid is moved to the closed position to prevent further downward movement of the lid during evacuation or heat sealing of the food storage container to prevent pre-sealing of a food storage container.

6. The appliance of claim 5, wherein the elastic members are springs.

7. The appliance of claim 5, wherein the resilient bumper is comprised of an elastomer.

8. The appliance of claim 7, wherein the elastomer is rubber.

9. A food storage appliance, comprising:
a housing;
a lid pivotally attached to the housing movable between an open and closed position;
a heat sealing element;
a resilient bumper mounted on an underside of the lid with at least one spring which biases the bumper into an extended position when the lid is open, and when the lid is moved to the closed position the bumper sandwiches a portion of the food storage container to be sealed against the heat sealing element while the spring allows the bumper to adjust to maintain even pressure on the food storage container along the heat sealing element, wherein
the at least one spring biases the bumper into an extended position during each of a vacuuming and a sealing process of the food storage appliance; and
at least one stand-off extending downwardly from a rear portion of the underside of the lid which engages the housing in proximity to the heat sealing element when the lid is moved to the closed position to prevent further downward movement of the lid during evacuation or heat sealing of the food storage container to prevent pre-sealing of a food storage container.

10. The appliance of claim 9, wherein the resilient bumper is of an elastomer.

11. The appliance of claim 10, wherein the elastomer is rubber.

* * * * *